United States Patent
Takei et al.

(10) Patent No.: US 12,187,903 B2
(45) Date of Patent: Jan. 7, 2025

(54) SURFACE-MODIFIED PARTICLE MATERIAL AND SLURRY COMPOSITION

(71) Applicant: ADMATECHS CO., LTD., Miyoshi (JP)

(72) Inventors: Kenta Takei, Miyoshi (JP); Yusuke Watanabe, Miyoshi (JP); Nobutaka Tomita, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

(21) Appl. No.: 17/953,430

(22) Filed: Sep. 27, 2022

(65) Prior Publication Data

US 2023/0024335 A1 Jan. 26, 2023

Related U.S. Application Data

(63) Continuation of application No. PCT/JP2020/041242, filed on Nov. 4, 2020.

(30) Foreign Application Priority Data

Mar. 31, 2020 (JP) ................................. 2020-065273

(51) Int. Cl.
| | | |
|---|---|---|
| C09C 3/12 | (2006.01) | |
| C09C 1/30 | (2006.01) | |
| C09D 7/62 | (2018.01) | |
| C09D 17/00 | (2006.01) | |

(52) U.S. Cl.
CPC .............. *C09C 3/12* (2013.01); *C09C 1/3081* (2013.01); *C09D 7/62* (2018.01); *C09D 17/002* (2013.01); *C09D 17/004* (2013.01); *C01P 2004/61* (2013.01); *C01P 2004/62* (2013.01)

(58) Field of Classification Search
CPC ........... H01L 21/8222; H01L 21/82285; H01L 27/0826; H01L 29/66272; H01L 29/7322; C01B 33/12; C01B 33/18; C01F 7/02; C01P 2004/61; C01P 2004/62; C08K 9/06; C09C 1/30; C09C 1/3081; C09C 3/12; C09D 17/002; C09D 17/004; C09D 7/62

See application file for complete search history.

(56) References Cited

U.S. PATENT DOCUMENTS

2008/0070146 A1* 3/2008 Fomitchev .............. C07F 7/10
423/592.1

FOREIGN PATENT DOCUMENTS

| JP | H0365506 A | * | 3/1991 |
|---|---|---|---|
| JP | 2002285003 A | | 10/2002 |
| JP | 2006096641 A | * | 4/2006 |
| JP | 2008007381 A | | 1/2008 |
| JP | 2008137854 A | | 6/2008 |
| JP | 2009251093 A | | 10/2009 |
| JP | 2011202016 A | | 10/2011 |
| JP | 2011207695 A | | 10/2011 |
| JP | 2012031306 A | | 2/2012 |
| JP | 2014214061 A | | 11/2014 |
| JP | 2016175981 A | | 10/2016 |
| JP | 2017036377 A | | 2/2017 |
| JP | 6746025 B | | 8/2020 |

OTHER PUBLICATIONS

Decision of Opposition issued Jul. 30, 2021 in Japanese Patent No. 6746025 (with Engish translation), 48 pages.
Decision to Grant issued Jun. 26, 2020 in Japanese Patent Application No. 2020-065273 (with English translation), 5 pages.
International Search Report issued Dec. 28, 2020 in PCT/JP2020/041242 (with English translation), 7 pages.
Notice of Submission of Publication by Third Parties issued Jan. 26, 2021 in Japanese Patent No. 6746025 (with English translation), 4 pages.
Opposition to Grant of Patent issued Mar. 18, 2021, in Japanese Patent No. 6746025 (with English translation), 167 pages.
Written Opinion issued Dec. 28, 2020 in PCT/JP2020/041242 (with English translation), 7 pages.
Combined Chinese Office Action and Search Report issued Oct. 26, 2023 in corresponding Chinese Patent Application No. 202080098824.0 (with machine English translation), 11 pages.

* cited by examiner

*Primary Examiner* — Shuangyi Abu Ali
(74) *Attorney, Agent, or Firm* — Element IP, PLC

(57) ABSTRACT

A particle material that has high dispersibility in a dispersion medium such as toluene having high hydrophobicity, and a slurry composition in which the particle material is used, are provided for solving the problem. A surface-modified particle material of the present invention includes: a particle material formed of an inorganic material; and a surface treatment agent formed of a silane compound having a first functional group that has any of C, N, and O atoms away over five or more atoms from Si to which an alkoxide is bound, the surface treatment agent allowing surface treatment of the particle material in such an amount that a degree of hydrophobicity becomes not less than 30%. Dispersibility is enhanced also in a dispersion medium having high hydrophobicity in a case where a functional group having a predetermined structure is introduced so as to impart predetermined or higher hydrophobicity.

18 Claims, No Drawings

SURFACE-MODIFIED PARTICLE MATERIAL AND SLURRY COMPOSITION

TECHNICAL FIELD

The present invention relates to a surface-modified particle material and a slurry composition.

BACKGROUND ART

To date, a resin composition in which a particle material formed of an inorganic material such as silica and alumina is dispersed as a filler material in a resin material has been widely used for semiconductor sealing materials, fillers of varnish for electronic substrate materials, paint, coating agents, adhesive, paste for ceramic materials, and the like. The presence of the filler material enhances mechanical characteristics and the like.

When the filler material is mixed for producing such a resin composition, the filler material is supplied in a dry state, and is supplied as necessary also as a slurry composition in which the filler material is dispersed in a dispersion medium (Patent Literature 1).

In a case where, for example, the filler material is mixed with a resin material having high hydrophobicity, a dispersion medium similarly having high hydrophobicity is preferably adopted as the dispersion medium of the slurry composition. For example, an aromatic hydrocarbon such as toluene may be adopted as the dispersion medium.

CITATION LIST

Patent Literature

Patent Literature 1: JP2002-285003 (A)

SUMMARY OF INVENTION

Technical Problem

However, uniform dispersion of a particle material formed of an inorganic material in a dispersion medium formed of an aromatic hydrocarbon such as toluene having high hydrophobicity is difficult. Therefore, a problem arises that precipitation/separation progresses during storage.

The present invention has been completed in view of the aforementioned circumstances, and an object of the present invention for solving the aforementioned problem is to provide a particle material that has high dispersibility in a dispersion medium such as toluene having high hydrophobicity, and a slurry composition in which the particle material is used.

Solution to Problem

The inventors of the present invention have found, as a result of thorough study for solving the aforementioned problem, that dispersibility in a dispersion medium such as toluene having high hydrophobicity is enhanced in a case where surface treatment is performed by using a specific surface treatment agent and a degree of hydrophobicity is made higher than a predetermined value, and have completed the invention described below.

(1) A surface-modified particle material of the present invention includes: a particle material formed of an inorganic material; and a surface treatment agent formed of a silane compound having a first functional group that has any of C, N, and O atoms away over five or more atoms from Si to which an alkoxide is bound and that has, in a part or an entirety of a chemical structure, at least one of a tertiary carbon atom, a phenyl group, a carbon-carbon double bond, and a cycloalkyl group, the surface treatment agent allowing surface treatment of the particle material in such an amount that a degree of hydrophobicity becomes not less than 30%.

Dispersibility is enhanced also in a dispersion medium having high hydrophobicity in a case where a functional group having a predetermined structure is introduced so as to impart predetermined or higher hydrophobicity.

The surface-modified particle material is preferably dispersed and used in a dispersion medium containing one or more kinds of aromatic compounds as a main component. The surface-modified particle material preferably has a volume average particle diameter of not less than 0.1 μm and not greater than 5 μm. The inorganic material preferably contains silica as a main component. In the description herein, "containing as a main component" means that a content is not less than 50% with respect to the total mass, and the content is preferably not less than 60%, more preferably not less than 70%, even more preferably not less than 80%, and particularly preferably not less than 90%.

(2) A slurry composition of the present invention includes the above-described surface-modified particle material, and a dispersion medium for dispersing the surface-modified particle material, the dispersion medium containing an aromatic compound as a main component.

Particularly, a number of shaking-by-hand times measured by a method described below for the slurry composition in which 70 mass % of the surface-modified particle material with respect to a total mass is dispersed, is preferably less than 100.

(The Method for Measuring the Number of Shaking-by-Hand Times)

In a cylindrical container having a diameter of 40 mm and a height of 120 mm, 100 mL of a test liquid is put, a cylindrical axis of the cylindrical container is aligned with a vertical direction, and the test liquid is left at 40° C. for 14 days as it is, reciprocation is thereafter performed in the cylindrical axis direction at a stroke of 100 mm per one time in a range of 0.5 times to 2 times per one minute, and a number of reciprocating times required until a precipitated layer becomes absent on a bottom when the cylindrical container is reversed, is determined as the number of shaking-by-hand times.

Furthermore, a content of the surface-modified particle material is preferably not less than 70% with respect to a total mass, and the viscosity is preferably not greater than 600 Pa·s.

Advantageous Effects of Invention

The surface-modified particle material of the present invention has the above-described configuration, and thus has excellent dispersibility in a dispersion medium having high hydrophobicity.

DESCRIPTION OF EMBODIMENTS

A surface-modified particle material and a slurry composition according to the present invention are described below in detail based on an embodiment. The surface-modified particle material of the present embodiment is dispersed in a dispersion medium to form a resin composition, or the surface-modified particle material of the present embodiment is dispersed in a liquid dispersion medium to form a slurry composition. Particularly, the surface-modified particle material of the present embodiment is preferably dispersed and used in a dispersion medium containing one or more kinds of aromatic compounds as a main component. The "one or more kinds of aromatic compounds as a main component" means that, on the basis of the total amount of an aromatic compound which may be a mixture of a plurality of kinds of compounds, the aromatic compounds form a main component based on the total mass. Examples of the aromatic compound include benzene, toluene, xylene, styrene, benzonitrile, and cumene.

(Surface-Modified Particle Material)

The surface-modified particle material of the present embodiment is a particle material having been subjected to surface treatment by using a surface treatment agent. The particle material is formed of an inorganic material. Examples of the inorganic material include oxides such as silica and alumina. Particularly, the main component is preferably silica. For example, an amount corresponding to silica is not less than 50%, not less than 60%, not less than 70%, not less than 80%, not less than 90%, not less than 95%, or 100% with respect to the mass of the entirety of the particle material.

Although a particle diameter of the particle material is not particularly limited, the particle diameter of the particle material is preferably selected so as to be not less than 0.1 µm and not greater than 5 µm after the surface treatment described below. Particularly, 0.1 µm or 0.3 µm is adopted as the lower limit value, and 5 µm, 2 µm, 1 µm, 0.9 µm, or 0.8 µm is adopted as the upper limit value. The combination of the upper limit value and the lower limit value is discretionary. In a case where the particle diameter is not less than the lower limit value, dielectric characteristics are enhanced and the particle material is suitably adopted for usage at a high frequency. In a case where the particle diameter is not greater than the upper limit value, precipitation is inhibited to enhance dispersibility.

The particle material preferably has high sphericity. The sphericity of the particle material is not less than 0.8, not less than 0.9, not less than 0.95, or not less than 0.99. The sphericity is determined as a value that is calculated by (sphericity)=$\{4\pi \times (area) \div (perimeter)^2\}$ based on an area and a perimeter of the particle observed when a photograph is taken by a SEM. The closer the value is to 1, the closer the particle material is to a complete sphere. Specifically, an average of values obtained by measuring 100 particles with use of an image processing device (Spectris Co., Ltd.: FPIA-3000) is adopted.

A method for producing the particle material is, but is not particularly limited to, for example, a method (VMC method) in which, in a case where the particle material is formed of a metal oxide, powder of the corresponding metal is put and burned in an oxidation atmosphere and thereafter quenched to produce the particle material, or a method (melting method) in which powder of an inorganic material of the particle material is put in flame, heated, and melted, and thereafter quenched to produce the particle material.

The surface treatment agent is brought into contact with a surface of the particle material to progress surface treatment. The surface treatment is performed by dissolving the surface treatment agent in a solvent and bringing the surface treatment agent into contact with the surface of the particle material, or by bringing the surface treatment agent into direct contact with the surface of the particle material. In the case of direct contact, the surface treatment agent in a liquid form or a gaseous form is brought into contact with the surface of the particle material. The surface treatment may be performed by bringing the surface treatment agent into contact with the surface of the particle material, and thereafter heating the obtained product. The heating temperature to be adopted is, but is not particularly limited to, for example, not lower than 40° C., not lower than 60° C., or not lower than 80° C. The time adopted for the surface treatment is, but is not particularly limited to, not shorter than 60 minutes, not shorter than 120 minutes, or not shorter than 180 minutes.

The surface treatment agent is formed of a silane compound having a first functional group that has any of C, N, and O atoms away over five or more atoms from Si to which an alkoxide is bound. Four functional groups are bound to Si, and one or more of the four functional groups may be the first functional groups. The "atom away over five or more atoms" represents the fifth atom when counting from Si. That is, in a case where an n-pentyl group is bound to Si, the carbon atom at the end of the pentyl group corresponds to the fifth atom.

In the first functional group, the same kinds of atoms need not be continuous, and the first functional group may have an atom of C, N, O, or the like. Furthermore, the first functional group is preferably bulky. The first functional group has at least one of a tertiary carbon atom, a phenyl group, a carbon-carbon double bond, and a cycloalkyl group.

Preferable examples of the surface treatment agent include 8-methacryloxyoctyltrimethoxysilane (methacryl group, tertiary carbon atom, carbon-carbon double bond: for example, KBM-5803 manufactured by Shin-Etsu Chemical Co., Ltd.), trimethoxy(2-phenylethyl)silane (phenyl group: manufactured by, for example, Shin-Etsu Chemical Co., Ltd.), 7-octenyltrimethoxysilane (vinyl group: for example, KBM-1083 manufactured by Shin-Etsu Chemical Co., Ltd.), hexyltrimethoxysilane (the number of carbon atoms is 6: for example, KBM-3063 manufactured by Shin-Etsu Chemical Co., Ltd.), and decyltrimethoxysilane (the number of carbon atoms is 10: for example, KBM-3103C manufactured by Shin-Etsu Chemical Co., Ltd.). Particularly, 8-methacryloxyoctyltrimethoxysilane, trimethoxy(2-phenylethyl)silane, and 7-octenyltrimethoxysilane are more preferable.

A treatment amount by the surface treatment agent is such an amount that a degree of hydrophobicity becomes not less than 30%. For example, the surface treatment agent is added in a range of about 0.1% to 2.0% with respect to the mass of the particle material. As the lower limit value, for example, 0.1%, 0.2%, 0.3%, 0.4%, 0.5%, or 0.8% is adopted. As the upper limit value, for example, 2.0%, 1.8%, or 1.5% is adopted. The combination of the upper limit value and the lower limit value is discretionary. As the lower limit value of the degree of hydrophobicity, 35%, 40%, 45%, or 50% is adopted. For the degree of hydrophobicity, the achieved upper limit value is determined depending on a kind of the surface treatment agent. By increasing the treatment amount by the surface treatment agent, the degree of hydrophobicity is made close to the upper limit value.

(Slurry composition) The slurry composition of the present embodiment contains the above-described surface-modified particle material of the present embodiment and a dispersion medium in which the surface-modified particle material is dispersed. A dispersant is contained as necessary. Addition of a dispersant allows the surface-modified particle material to be more uniformly dispersed. As the dispersant, a high molecular dispersant may be adopted. When the slurry composition is produced, stirring, application of a shearing force, or ultrasonic irradiation may be performed for uniform dispersion.

A content of the surface-modified particle material is, but is not particularly limited to, not less than 50% with respect to the mass of the entirety of the slurry composition. As the lower limit value, 60%, 65%, 70%, 75%, or 80% is adopted.

The dispersion medium contains an aromatic compound such that the content of the aromatic compound is not less than 50 mass %. Particularly, the content of the aromatic compound is not less than 60 mass %, not less than 70 mass %, not less than 80 mass %, not less than 90 mass %, not less than 95 mass %, or 100 mass %. A hydrocarbon, a monomer, or the like as well as the aromatic compound may be added. Examples of the aromatic compound include benzene, toluene, xylene (any of o-, m-, p-xylenes), styrene, benzonitrile, and cumene. Particularly, toluene is preferably adopted.

For the slurry composition of the present embodiment, the number of shaking-by-hand times measured by the following method is preferably less than 100 and more preferably not greater than 50 for the slurry composition in which 70 mass % of the surface-modified particle material with respect to the total mass is dispersed.

(Method for measuring the number of shaking-by-hand times)

In a cylindrical container having a diameter of 40 mm and a height of 120 mm, 100 mL of a test liquid is put, the cylindrical axis of the cylindrical container is aligned with the vertical direction, and the test liquid is left at 40° C. for 14 days as it is.

Thereafter, reciprocation is performed in the cylindrical axis direction at a stroke of 100 mm per one time in a range of 0.5 times to 2 times per one minute.

The number of reciprocating times required until a precipitated layer becomes absent on the bottom when the cylindrical container is reversed, is determined as the number of shaking-by-hand times.

Furthermore, in the slurry composition of the present embodiment, the content of the surface-modified particle material is preferably not less than 70% with respect to the total mass, and the viscosity is preferably not greater than 600 Pa·s. The viscosity is measured at an ordinary temperature.

EXAMPLES

The surface-modified particle material and the slurry composition according to the present invention are described below in detail based on examples.

(Test 1)

A surface treatment agent in an amount indicated in Table 1 was caused to react with 100 parts by mass of a particle material (sphericity was not less than 0.9 and the volume average particle diameter was 0.5 μm, manufactured by Admatechs Company Limited: SC2500-SQ) formed of silica. The conditions for the surface treatment were such that the surface treatment agent was added to the particle material, and the reaction was made at 25° C. for 24 hours to produce a test sample of each of test examples.

For the obtained test sample of each test example, a degree of hydrophobicity was measured. The degree of hydrophobicity was measured as follows. A stirrer was put in a flask, 50 mL of ion exchanged water was metered, and 0.2 g of the sample was caused to quietly float on a water surface. The stirrer was rotated and methanol was quietly dropped so as not to expose the sample directly to the methanol. The degree of hydrophobicity was calculated from a volume percentage of an amount of methanol when the whole sample was precipitated from the water surface. Table 1 collectively indicates the results. In Test examples 11 and 12, the whole powder was immediately precipitated when the sample was put in the ion exchanged water, and the measurement was impossible.

(Degree of hydrophobicity: %)=100×(amount of dropped methanol (mL))÷(50 mL+amount of dropped methanol (mL))

For the test sample of each test example, a viscosity was measured when the test sample was dispersed in toluene at a concentration of 70 mass %. The viscosity was measured by a vibration type viscometer (VM-10A-L manufactured by SEKONIC CORPORATION). The prepared slurries (all of which contained 1 mass % of high molecular dispersant) were slurry compositions of the test examples, respectively.

For the slurry composition of each test example, 100 mL of a test liquid was put in a cylindrical container having a diameter of 40 mm and a height of 120 mm, the cylindrical axis of the cylindrical container was aligned with the vertical direction, and the test liquid was left at 40° C. for 14 days as it was. At that time, the thickness of the precipitated layer on the bottom was measured by reversing the cylindrical container. Table 1 collectively indicates the results.

Thereafter, reciprocation was performed in the cylindrical axis direction at a stroke of 100 mm per one time in a range of 0.5 times to 2 times per one minute.

The number of reciprocating times required until the precipitated layer became absent on the bottom when the cylindrical container was reversed, was determined as the number of shaking-by-hand times. Table 1 indicates the results.

TABLE 1

|  | Test example 1 | Test example 2 | Test example 3 | Test example 4 | Test example 5 | Test example 6 |
| --- | --- | --- | --- | --- | --- | --- |
| (Partial) structure of first functional group | methacryl | phenyl | vinyl | hexyl | decyl | propyl |
| Surface treatment agent | KBM-5803 | — | KBM-1083 | KBM-3063 | KBM-3103C | KBM-3033 |
| The number of atoms from Si to farthest (C, N, O) atom in first functional group | 12 | 6 | 10 | 6 | 10 | 3 |

TABLE 1-continued

|  |  |  |  |  |  |  |
|---|---|---|---|---|---|---|
| Precipitation thickness (mm) | 4 | 4 | 3 | 17 | 15 | 19 |
| The number of shaking-by-hand times required until precipitated layer became absent (the number of times) | 20 | 30 | 20 | 80 | 90 | 100 |
| Viscosity in the absence of dispersant: 70 wt % (viscosity according to vibration) | 106 | 429 | 430 | measurement was impossible | 1153 | measurement was impossible |
| Degree of hydrophobicity (%) | 35 | 43 | 53 | 51 | 57 | 41 |
| Amount of added surface treatment agent (%) | 1.3 | 1.1 | 1.5 | 0.9 | 1 | 0.6 |
| Classification | High-concentration slurry was formed even in the absence of dispersant | | | High-concentration slurry was formed in the presence of dispersant | | |

|  | Test example 7 | Test example 8 | Test example 9 | Test example 10 | Test example 11 | Test example 12 |
|---|---|---|---|---|---|---|
| (Partial) structure of first functional group | phenylamino | methacryl | phenyl | vinyl | epoxy | epoxy |
| Surface treatment agent | KBM-573 | KBM-503 | KBM-103 | KBM-1003 | KBM-4803 | KBM-403 |
| The number of atoms from Si to farthest (C, N, O) atom in first functional group | 8 | 7 | 4 | 2 | 12 | 7 |
| Precipitation thickness (mm) | 12 | 7 | 17 | 15 | 80 | measurement was impossible |
| The number of shaking-by-hand times required until precipitated layer became absent (the number of times) | 250 | 260 | 250 | 250 | measurement was impossible | measurement was impossible |
| Viscosity in the absence of dispersant: 70 wt % (viscosity according to vibration) | measurement was impossible | 661 | measurement was impossible | measurement was impossible | measurement was impossible | — |
| Degree of hydrophobicity (%) | 13 | 24 | 40 | 29 | measurement was impossible | measurement was impossible |
| Amount of added surface treatment agent (%) | 1 | 1 | 1 | 1 | 1 | 1.2 |
| Classification | High-concentration slurry was formed in the presence of dispersant | | | | | Slurry was not formed even in the presence of dispersant |

As is apparent from Table 1, the number of shaking-by-hand times was less than 100 and dispersibility was excellent in Test examples 1 to 5 as compared with Test examples 6 to 12. According to comparison between Test examples 1 and 8, in Test example 8 in which the degree of hydrophobicity was less than 30% although a methacryl group was similarly contained and the number of the atoms when counting from Si was not less than 5, the number of shaking-by-hand times was 260 and sufficient dispersibility was not achieved. Also in Test examples 7, 11, and 12 in which the number of the atoms when counting from Si was not less than 5, since the degree of hydrophobicity was less than 30%, the number of shaking-by-hand times was not less than 100 and sufficient dispersibility was not achieved.

In Test examples 1 to 3, a methacryl group (tertiary carbon atom), a phenyl group, and a vinyl group, respectively, were contained. Therefore, the viscosity in the absence of a dispersant was lowered as compared with Test examples 4 and 5. That is, as compared with Test examples 4 and 5 in which the number of the atoms was not less than 5 and the degree of hydrophobicity was not less than 30%, more excellent performance was confirmed to be exhibited in Test examples 1 to 3 in which a methacryl group, a phenyl group, and a vinyl group, respectively, were contained.

According to comparison between Test examples 2 and 9, in Test example 9 in which the number of the atoms when counting from Si was less than 5 (4 in Test example 9) although a phenyl group was similarly contained and the degree of hydrophobicity was not less than 30%, the number of shaking-by-hand times was 250 and sufficient dispersibility was not achieved.

Also in Test examples 6 and 10, since the number of the atoms when counting from Si was less than 5, the number of shaking-by-hand times was not less than 100 and sufficient dispersibility was not achieved. Particularly in Test example 10, since the degree of hydrophobicity was less than 30, the number of shaking-by-hand times was increased as compared with Test example 6.

(Test 2)

Change of dispersibility according to change of the number of the atoms when counting from Si was examined. For the slurry compositions of Test examples 3 and 10, an amount of the slurry composition that passed before a 10 μm filter (filtration area of 3.14 cm$^2$) was clogged, was measured. While the slurry composition was supplied onto the filter so as to maintain 2 cm as the height of the slurry composition, the slurry composition was caused to pass through the filter by naturally dropping the slurry composition, and an amount of the slurry composition that passed before clogging of the filter stopped the passage of the slurry composition was measured.

As a result, the amount of the slurry composition was 28 g in Test example 3 in which the number of the atoms when counting from Si was 10, and the amount of the slurry composition was 4 g in Test example 10 in which the number of the atoms when counting from Si was 2. Even when a functional group having a vinyl group was similarly bound, dispersibility was confirmed to be enhanced by increasing the number of the atoms when counting from Si.

The invention claimed is:

1. A surface-modified particle material consisting of:
 a particle material formed of an inorganic material and having a sphericity of 0.8 or more; and
 a surface treatment agent with which a surface of the particle material is treated and which is in contact with the surface of the particle material, the surface treatment agent consisting of:
  at least one silane compound having a first functional group that has any of C, N, and O atoms away over five or more atoms from Si to which an alkoxide is bound and that has, in a part or an entirety of a chemical structure, at least one of a tertiary carbon atom, a phenyl group, a carbon-carbon double bond, and a cycloalkyl group; and
  optionally, a solvent,
 the surface treatment agent allowing surface treatment of the particle material in such an amount that a degree of hydrophobicity becomes not less than 30%,
 wherein if the surface-modified particle material is dispersed in toluene to obtain a slurry composition such that an amount of the surface-modified particle material in the slurry composition is 70 mass % relative to a total mass of the slurry composition, a number of shaking-by-hand times for the slurry composition is less than 100, wherein the number of shaking-by-hand times is measured by:
  putting 100 mL of the slurry composition in a cylindrical container having a diameter of 40 mm and a height of 120 mm, and leaving the slurry composition at 40° C. for 14 days as it is such that a cylindrical axis of the cylindrical container is aligned with a vertical direction;
  thereafter performing reciprocation in the cylindrical axis direction at a stroke of 100 mm per one time in a range of 0.5 times to 2 times per one minute; and
  determining a number of reciprocating times required until a precipitated layer becomes absent on a bottom when the cylindrical container is reversed, as the number of shaking-by-hand times.

2. The surface-modified particle material according to claim 1, wherein the surface-modified particle material is dispersed and used in a dispersion medium comprising one or more kinds of aromatic compounds as a main component.

3. The surface-modified particle material according to claim 1, wherein a volume average particle diameter of the particle material is not less than 0.1 μm and not greater than 5 μm.

4. The surface-modified particle material according to claim 1, wherein the inorganic material comprises silica as a main component.

5. The surface-modified particle material according to claim 1, wherein the surface-modified particle material is dispersed and used in a dispersion medium comprising one or more kinds of aromatic compounds as a main component,
 a volume average particle diameter of the particle material is not less than 0.1 μm and not greater than 5 μm, and,
 the inorganic material comprises silica as a main component.

6. A slurry composition comprising:
 the surface-modified particle material according to claim 1; and
 a dispersion medium dispersing the surface-modified particle material, the dispersion medium comprising one or more kinds of aromatic compounds as a main component.

7. The slurry composition according to claim 6, wherein a number of shaking-by-hand times for the slurry composition is less than 100 when an amount of the surface-modified particle material in the slurry composition is adjusted to 70 mass % relative to a total mass of the slurry composition, wherein the number of shaking-by-hand times is measured by:
 putting 100 mL of the slurry composition in a cylindrical container having a diameter of 40 mm and a height of 120 mm, and leaving the slurry composition at 40° C. for 14 days as it is such that a cylindrical axis of the cylindrical container is aligned with a vertical direction;
 thereafter performing reciprocation in the cylindrical axis direction at a stroke of 100 mm per one time in a range of 0.5 times to 2 times per one minute; and
 determining a number of reciprocating times required until a precipitated layer becomes absent on a bottom when the cylindrical container is reversed, as the number of shaking-by-hand times.

8. The slurry composition according to claim 6, wherein
a content of the surface-modified particle material in the slurry composition is not less than 70% with respect to a total mass of the slurry composition, and
a viscosity of the slurry composition is not greater than 600 Pa·s.

9. A slurry composition comprising:
the surface-modified particle material according to claim 3; and
a dispersion medium dispersing the surface-modified particle material, the dispersion medium comprising one or more kinds of aromatic compounds as a main component.

10. The slurry composition according to claim 9, wherein
a content of the surface-modified particle material in the slurry composition is not less than 70% with respect to a total mass of the slurry composition, and
a viscosity of the slurry composition is not greater than 600 Pa·s.

11. A slurry composition comprising:
the surface-modified particle material according to claim 4; and
a dispersion medium dispersing the surface-modified particle material, the dispersion medium comprising one or more kinds of aromatic compounds as a main component.

12. The slurry composition according to claim 11, wherein
a content of the surface-modified particle material in the slurry composition is not less than 70% with respect to a total mass of the slurry composition, and
a viscosity of the slurry composition is not greater than 600 Pa·s.

13. A slurry composition comprising:
the surface-modified particle material according to claim 5; and
a dispersion medium dispersing the surface-modified particle material, the dispersion medium comprising one or more kinds of aromatic compounds as a main component.

14. The slurry composition according to claim 13, wherein
a content of the surface-modified particle material in the slurry composition is not less than 70% with respect to a total mass of the slurry composition, and
a viscosity of the slurry composition is not greater than 600 Pa·s.

15. The surface-modified particle material according to claim 1, wherein the sphericity of the particle material is 0.95 or more.

16. The surface-modified particle material according to claim 1, wherein an amount of the surface treatment agent is 0.1% to 2.0% by mass with respect to a mass of the particle material.

17. The surface-modified particle material according to claim 1, wherein the degree of hydrophobicity of the surface-modified particle material is not less than 45%.

18. The surface-modified particle material according to claim 1, wherein the at least one silane compound comprises 8-methacryloxyoctyltrimethoxysilane or 7-octenyltrimethoxysilane.

* * * * *